(12) United States Patent
Kirilichin et al.

(10) Patent No.: US 10,233,956 B2
(45) Date of Patent: Mar. 19, 2019

(54) INSERT ALIGNMENT AND INSTALLATION DEVICES AND METHODS

(71) Applicants: Victor Kirilichin, Madison, CT (US); David P. Turechek, Shelton, CT (US); Brian P. Krieger, Albion, NY (US)

(72) Inventors: Victor Kirilichin, Madison, CT (US); David P. Turechek, Shelton, CT (US); Brian P. Krieger, Albion, NY (US)

(73) Assignee: Engineered Inserts & Systems, Inc., Watertown, CT (US)

( * ) Notice: Subject to any disclaimer, the term of this patent is extended or adjusted under 35 U.S.C. 154(b) by 463 days.

(21) Appl. No.: 14/840,268

(22) Filed: Aug. 31, 2015

(65) Prior Publication Data

US 2017/0058931 A1 Mar. 2, 2017

(51) Int. Cl.
*F16B 11/00* (2006.01)

(52) U.S. Cl.
CPC .................. *F16B 11/002* (2013.01)

(58) Field of Classification Search
CPC .... F16B 11/002; F16B 21/00; B25B 27/0014; B25B 27/0028
See application file for complete search history.

(56) References Cited

U.S. PATENT DOCUMENTS

| 4,584,755 | A | * | 4/1986 | Lundquist | ........... B25B 27/0007 138/89 |
|---|---|---|---|---|---|
| 4,712,578 | A | | 12/1987 | White | |
| 4,904,148 | A | * | 2/1990 | Larsson | ..................... B25J 9/04 414/680 |
| 4,945,789 | A | | 8/1990 | Martinengo | |
| 5,167,743 | A | | 12/1992 | Chalfin | |
| 6,035,519 | A | | 3/2000 | Albright | |
| 2009/0017732 | A1 | * | 1/2009 | Curodeau | ................. B24B 1/04 451/56 |
| 2010/0265708 | A1 | * | 10/2010 | Lin | ....................... F21V 29/004 362/249.02 |
| 2013/0298371 | A1 | | 11/2013 | Otten et al. | |
| 2015/0202754 | A1 | | 7/2015 | Kirilichin et al. | |

OTHER PUBLICATIONS

Engineered Inserts & Systems, Inc. EIS-11 Metric Series Sealing Plugs. Product Specification (online]. Mar. 30, 2014 [retrieved on Oct. 24, 2016]. Retrieved from the internet: <URL: http://www.eisinserts.com/images/EIS 11 %20Metric%20Sealing%20Plugs.pdf>. 1 page.

* cited by examiner

*Primary Examiner* — Moshe Wilensky
(74) *Attorney, Agent, or Firm* — St. Onge Steward Johnston & Reens, LLC

(57) ABSTRACT

A method and device for sealing holes in blocks such as hydraulic manifolds, engine blocks and the like is provided and includes a sheet with a plurality of holes therein, each hole is designed to receive an insert of a particular size and each hole corresponds to an installation hole in a block or manifold such that when the sheet is aligned with the block/manifold, the insert can be pressed into the installation hole and expanded against the wall of the installation hole. The sheet provides protection against damage of the block during installation of the inserts therein, which may be accomplished with a pneumatic hammer.

12 Claims, 6 Drawing Sheets

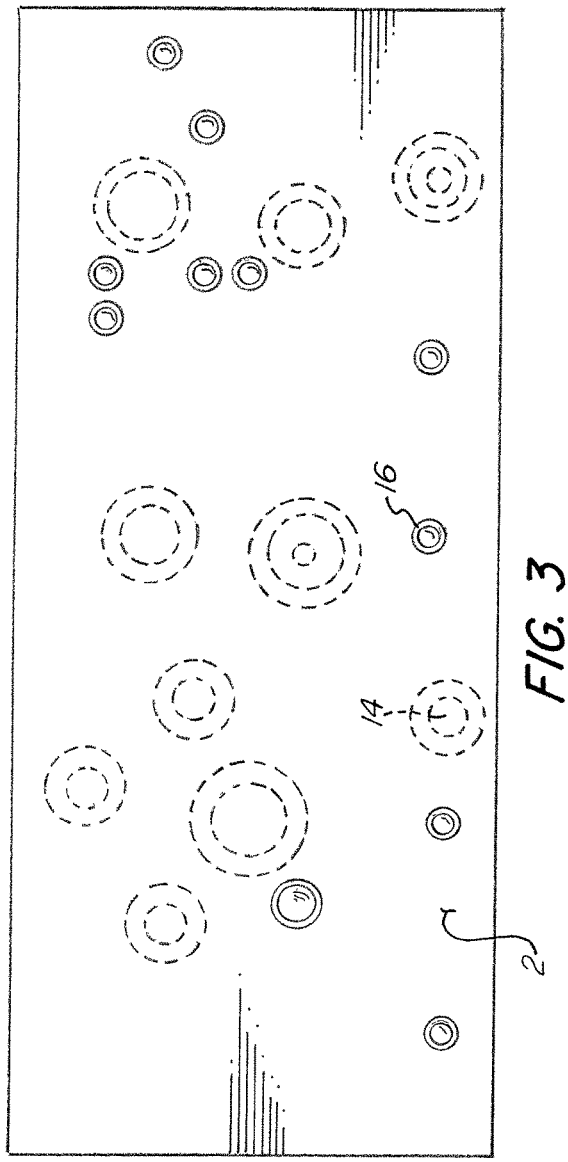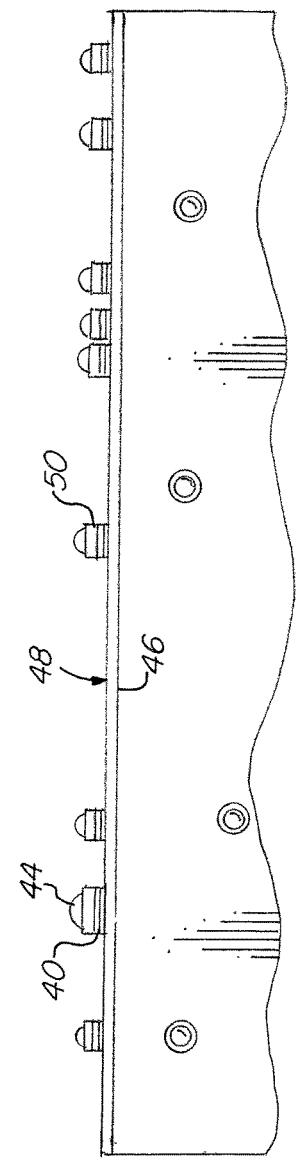

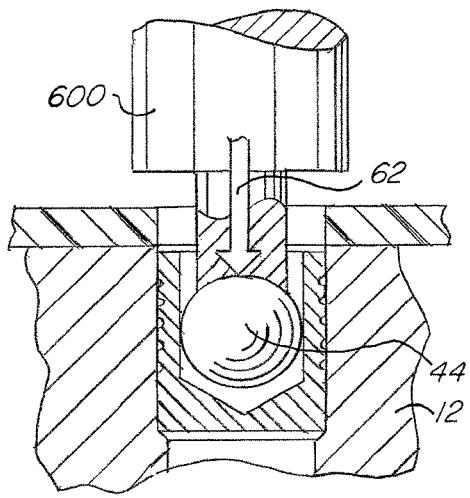
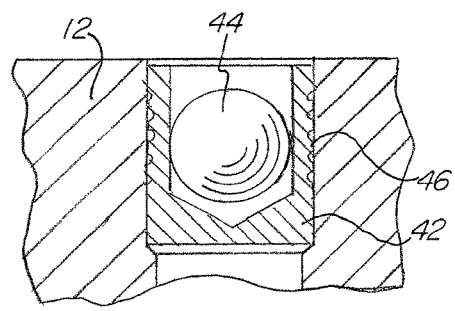
FIG. 11    FIG. 12
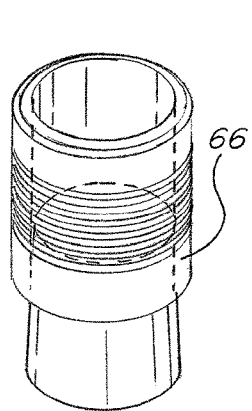
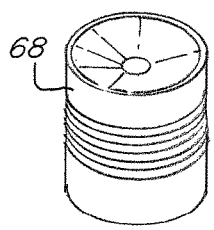
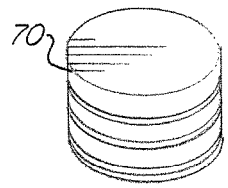
FIG. 13    FIG. 14    FIG. 15

INSERT ALIGNMENT AND INSTALLATION DEVICES AND METHODS

FIELD OF THE INVENTION

The invention relates to devices and methods for installing inserts in blocks such as manifolds and the like, more particularly, the invention relates to a device that assists with proper placement and installation of inserts.

BACKGROUND OF THE INVENTION

Inserts are used in a variety of applications to seal, restrict or otherwise modify holes in systems such as hydraulic or engine systems. These inserts vary in size and depending on the application, there may be multiple inserts needed to provide a properly sealed manifold.

In the example of hydraulic manifolds, there are numerous holes provided during machining that may be used to carve out internal passageways within the block. These holes may vary in size such that different insert sizes are needed to seal the holes after machining operations are completed.

Manifolds will often have other passages that are not to be sealed. For example, hydraulic hoses and other lines or parts may be threaded or otherwise attached to the manifolds so that fluid can flow within the passages.

The inserts used to seal the appropriate holes in the manifold are often small and can sometimes fall into the passages. The operator must then rotate the block or somehow retrieve the insert from the passage, which can cause delays.

Since the size of the holes may vary, sometimes the wrong insert is placed in the wrong hole due to relatively close sizes. Since hydraulic manifolds often operate under high pressure, improper selection of inserts could result in a seal that cannot withstand the appropriate pressures.

As yet another concern, once the inserts are placed in the appropriate holes, they must be expanded. In some cases, this is done with an air hammer. The hammer is typically intended be used to install or expand the insert without damaging the manifold. In some cases, operators will miss the insert and damage the manifold to the point where it must be discarded or recycled. Since the manifold has undergone complicated machining processes prior to the installation of inserts, damage to the manifold at the later stages can cause significant waste of resources and money.

SUMMARY OF THE INVENTION

It is therefore an object of the invention to improve alignment and placement of inserts to ensure proper placement and reduce the possibility that inserts fall into passages of manifolds or blocks.

It is another object of the invention to provide protection for the manifold/block during installation of inserts to reduce the possibility of damage to the manifold/block.

It is yet another object of the invention to provide a faster and easier way to install inserts in hydraulic and/or pneumatic systems.

These and other objects are achieved by providing a sheet with a plurality of holes therein, each hole is designed to receive an insert of a particular size and each hole corresponds to an installation hole in a block or manifold such that when the sheet is aligned with the block/manifold, the insert can be pressed into the installation hole and expanded against the wall of the installation hole.

In one aspect a method of installing inserts in a block is provided and includes the steps of: providing a sheet having a thickness and a plurality of holes therein, the plurality of holes each having an insert installed therein; providing a block having a plurality of installation holes; aligning the sheet with the block such that the plurality of holes and the plurality of installation holes align; installing the inserts into the installation holes such that an outer surface of the at least one of the plurality of inserts is forced against a wall corresponding the installation hole.

The installing step may further include expanding inserts against the wall. The installing step may also include pressing an inner section of the corresponding insert into an outer section to expand the outer section against the wall. The inner section may be in the shape of a ball. The pressing may be accomplished with a pneumatic hammer.

The sheet may define a bottom surface and a bottom the inserts may extend below the bottom surface such that at least part the insert is within the corresponding installation hole after the aligning step. After the inserting step a top of an outer section the insert may align at or below a face of the block such that substantially the entire outer section is contained within the installation hole.

The block may have a face and the plurality of holes may be located in the face. A surface of the sheet may further be in contact with the face after the aligning step.

The inserts may be expanded by pulling an inner section into an outer section.

In other aspects an expansion insert alignment is provided for installing expansion inserts in a block. A sheet is provided with a thickness and a plurality of holes therein, each one of the plurality of holes has a corresponding installation hole in the block. A plurality of expansion inserts are adapted to fit the plurality of holes such that when the sheet is aligned with the block, the installation holes and the plurality of expansion inserts align.

When the sheet is aligned with the block, a center of each of the plurality of expansion inserts aligns with a center of a corresponding one of the plurality of installation holes. The block may be an engine block. The block may be a manifold or a hydraulic manifold. The sheet may be made of a flexible plastic.

In some cases one or more of the plurality of expansion inserts are fitted such that a bottom of the expansion insert extends below a bottom face of the sheet. The top of the expansion insert may include a ball. The bottom of the expansion insert may be located on an outer section thereof.

In other aspects, a method is provided for preparing an installation sheet for installing inserts in a block. The method may include one or more of the steps of providing an installation sheet with a plurality of holes therein, each one of the plurality of holes corresponding to an installation hole in the block; providing a plurality of inserts, each insert corresponding to one of the plurality of holes; fitting each of the plurality of inserts into the corresponding one of the plurality of holes.

A second sheet may be provided having at least one void and the method may include placing the installation sheet on top of the second sheet such that a bottom face of the installation sheet is spaced apart from a surface that the second sheet rests on. The fitting step may include fitting the inserts into the corresponding holes such that at least part of the insert extends below the bottom face of the installation sheet and into the at least one void. In certain embodiments, the fitting step is performed by a computer controlled fitting device such as a robotic arm.

Other objects of the invention and its particular features and advantages will become more apparent from consideration of the following drawings, claims and accompanying detailed description. It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions or combinations of functions described herein.

BRIEF DESCRIPTION OF THE DRAWINGS

FIG. 3 is a top un-exploded view of FIG. 1

FIG. 4 is a side view of FIG. 3

FIG. 11 is a side detail section view showing expansion of the insert of FIG. 1.

FIG. 12 is a side detail section view showing the insert installed in the manifold of FIG. 1

FIGS. 13-15 are perspective views of some alternate insert/plugs that can be substituted for those shown in FIG. 1.

DETAILED DESCRIPTION OF THE INVENTION

Figure 1:
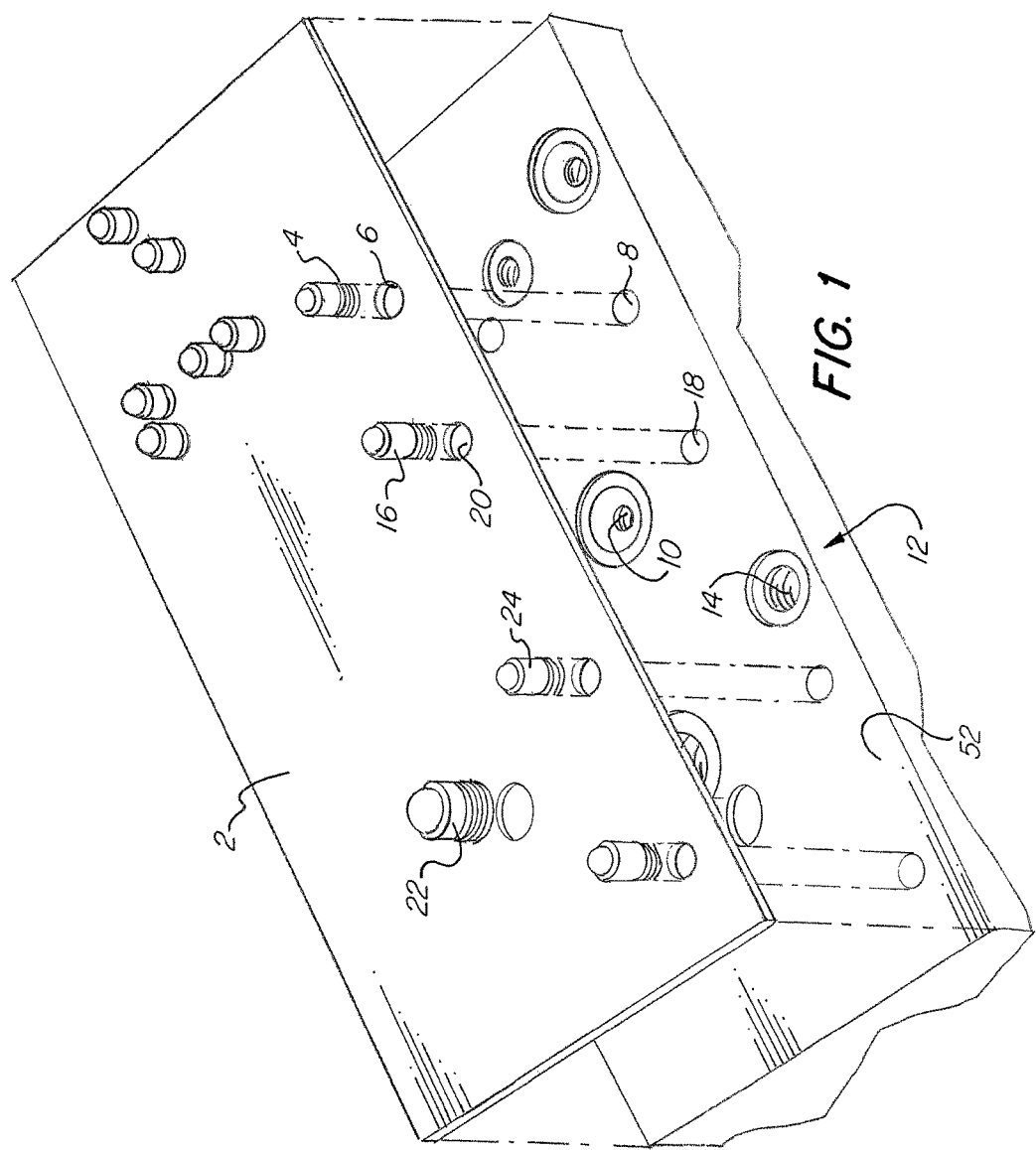
FIG. 1 is a top exploded perspective view of the present invention.

Referring now to the drawings, wherein like reference numerals designate corresponding structure throughout the views, the following examples are presented to further illustrate and explain the present invention and should not be taken as limiting in any regard.

In FIG. 1 a sheet 2 is shown with a number of holes 6 therein. The holes 6 may be of different sizes that are matched to a particular size insert 4. The inserts shown are commonly referred to as ball expansion inserts. The holes 6 in the sheet 2 correspond to installation holes 8 in a block 12.

Figure 2:
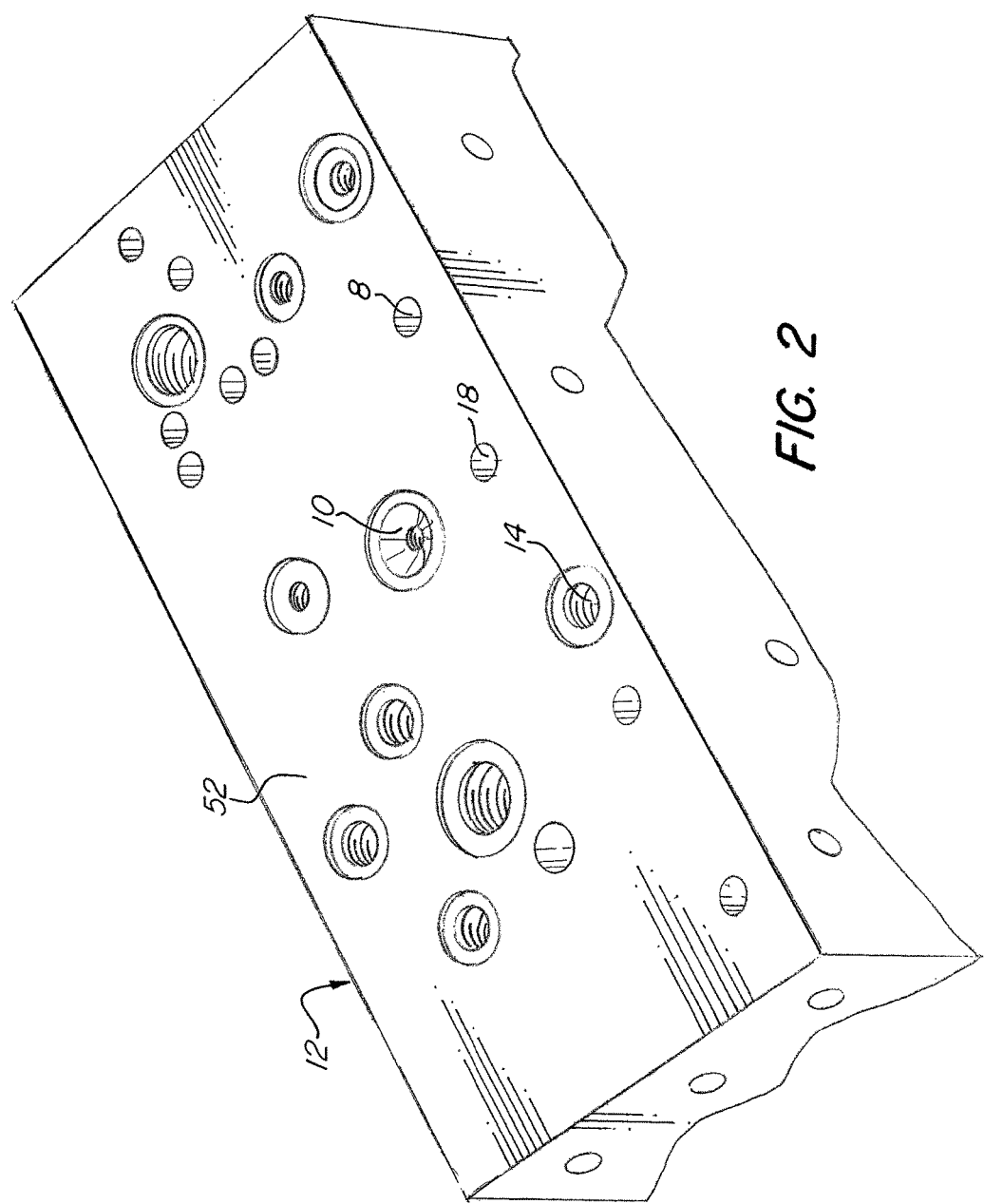
FIG. 2 is a top perspective view of the manifold of FIG. 1

In FIG. 2, the block 12 is shown during manufacturing where the holes 8 and passages 10 have been machined out. Although not shown in the drawing, there may be numerous internal passages connecting different passages 10, depending on the desired configuration. The holes 8 may be used to machine out particular elements of these internal passageways during machining processes. As can be seen, some of the passages 10 are larger significantly larger than some of the inserts 4. As an example, consider insert 16 and passage 14.

With conventional insert installation systems, the operator would be required to pick out insert 16 from a selection of inserts and place insert 16 in hole 18. If insert 16 is mis-handled or dropped, there is the possibility that it will fall into passage 14 and become stuck in the internal passageways of the block.

In FIG. 3, the sheet 2 is aligned with the block 12 such that the installation holes 8, 18 etc in the block align with the corresponding holes 6 etc in the sheet 2 and the inserts 4, 16 etc all align. As shown, installation hole 18 corresponds to insert 16 and hole 20 in the sheet 2. As can also be seen, inserts can vary in size, for example, insert 22 is larger than insert 16.

The inserts may also be relatively close in size such that it is difficult for the installer to distinguish between the two. In typical installation operations, placement of the wrong insert could occur due to the sizes being relatively close. If the block 12 is part of a hydraulic system, pressures could be relatively high, for example 10,000 psi or more. The inserts may be designed to withstand blow out pressures of 40,000 psi, but such a design pressure would only exist if the correct size insert were installed in the correct size hole. The use of the sheet and its corresponding holes and inserts may help ensure that the correct insert is placed in the correct hole.

Figure 7:
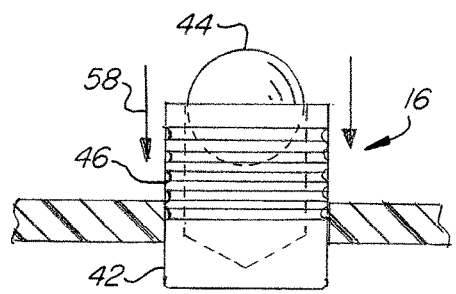
FIG. 7 is a side detail section view of the sheet of FIG. 1 with an insert installed therein.

As shown in FIGS. 4 and 7, the inserts may be installed in the sheet 2 such that a bottom part 42 of the insert extends below the bottom surface 46 of the sheet 2. The top part 40 may extend above the top surface 48 at a distance greater than a second distance that the bottom part 42 extends below the bottom surface 46. In some cases, the second distance may be larger than the distance. The bottom part 42 may be useful in helping to align the sheet 2 with the block 12 because when aligned, the bottom part 42 may rest part way in the corresponding installation hole. As shown, the bottom part extends below the bottom surface 46 about ⅛ of an inch.

To install the insert into the installation hole, the insert is pressed into the installation hole such that the top edge 50 is moved closer to the surface 52 of the block 12. The bottom edge 54 of the insert is stopped inside the installation hole by a step down diameter section where the first part of the installation hole is of a size such that the insert can fit therein and a second diameter located below the first part of the installation hole is smaller than the insert. This causes the insert to stop at a pre-determined depth. Typically, this depth causes the top edge 50 to align with the surface 52, but in some cases, the top edge 50 will be below top edge 50. See FIGS. 6-10 showing installation of the insert in the sheet and then installation of the insert into the manifold using the sheet for placement. As seen in FIG. 11, the insert is then expanded by pressing the ball into the insert.

Although ball type inserts are shown, other inserts whether expansion or other may be used. For example, consider the insert shown an described in U.S. patent application Ser. No. 14/512,018, the content of which is incorporated herein by reference. Examples of alternate inserts are shown in FIGS. 13-15. Non-expanding types of inserts may be plugs or others that are forced into a hole to seal it (FIGS. 14, 15). Typically, these types are made of a softer metal than the block 12.

In FIG. 2, other holes/passages are shown on other faces of the manifold. The passages may be threaded or designed to receive additional inserts, depending on the configuration. The threaded passages such as passage 14 may receive a threaded end of a hydraulic hose. Additional sheets may be configured for different sides/faces of the block as appropriate.

The ball type inserts and some other expanding inserts are expanded against the wall of the installation hole using a substantial force. Once the insert is properly located, an pneumatic hammer or other type of force inducing device presses the ball further into the body of the insert and this causes the body of the insert to expand against the wall of the installation hole (See FIG. 11). This creates a seal that reduces or prevents leakage. In some cases, a reducing insert is used in the installation hole which effectively reduces the size of the opening. Such a reducing insert may have an internal hole that remains open after installation of the insert to allow for a reduced size opening.

Figure 5:
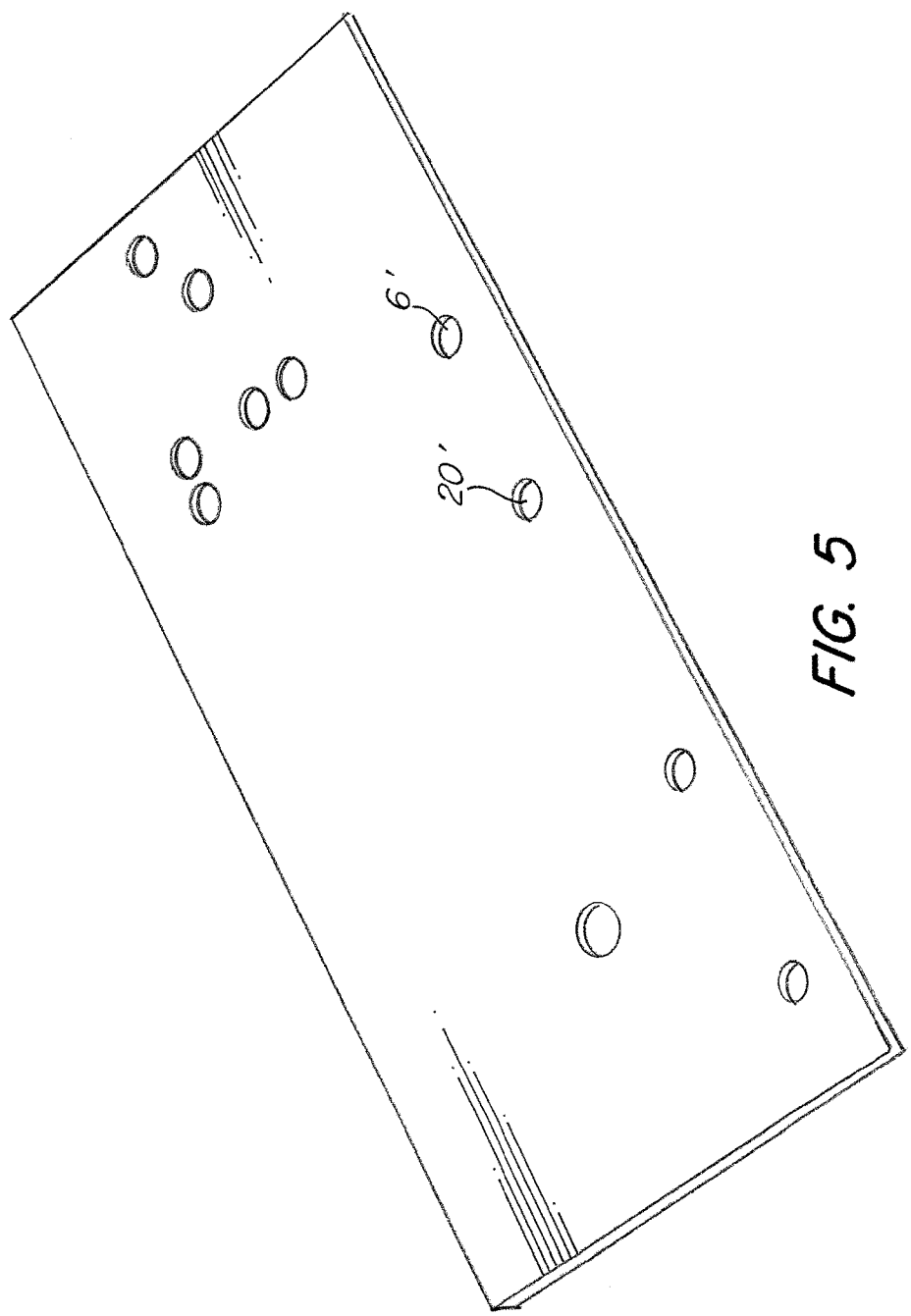
FIG. 5 is a perspective view of a second sheet for assembling the sheet of FIG. 1.
Figure 6:
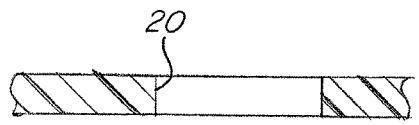
FIG. 6 is a detail section view of the sheet of FIG. 1

FIG. 5 shows sheet 2 and second sheet. Second sheet 60 also is shown with a number of holes 20', 6' etc. therein. Hole 20' is larger than hole 20 in order to allow for installation of the inserts such that the bottom section is located below the bottom surface 46 as shown in FIG. 7. The sheet 2 is placed on top of the second sheet such that the holes align and the inserts are pressed into the appropriate holes in the sheet 2. This second sheet 60 acts as a spacer to enable the inserts to extend below so that the sheet can be properly aligned with the block 12. For example, see FIG. 7 which shows the insert extending partially below the sheet before installation of the insert in the block.

The sheet 2 when installed also provides protective qualities during installation of the inserts. In common practices, if the operator misses the insert with the hammer or the hammer jumps off the ball, the end of the hammer could impact the block 12 and cause damage thereto. The damage can sometimes be irreparable, which means the block 12 becomes scrap metal, even after all the complicated machining operations that occurred to create the internal passageways.

Figure 8:
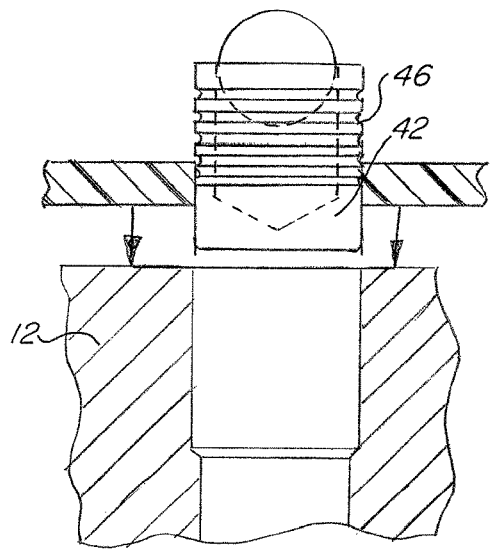
FIGS. 8-9 is a side detail section view showing placement of the sheet on the manifold of FIG. 1.
Figure 9:
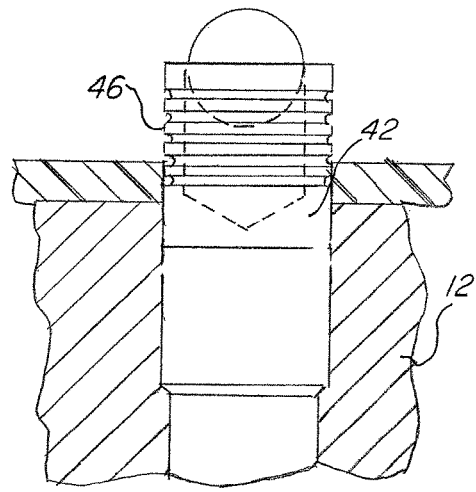
Figure 10:
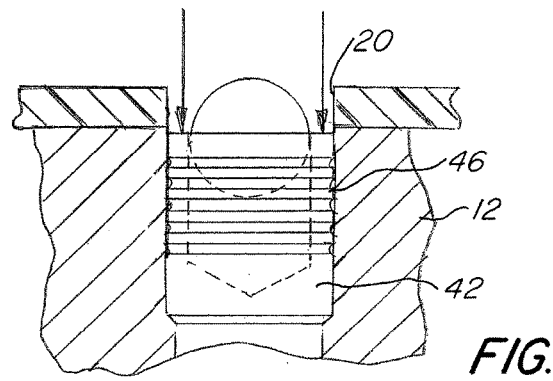
FIG. 10 is a side detail section view showing pressing the insert into the manifold hole of FIG. 1 that is to be sealed.

Referring to FIGS. 6-12, the hole 20 is shown in the sheet and the insert is pressed 58 into the hole as shown in FIG. 7. Although not shown in FIG. 7 the second sheet may be placed below the first sheet of FIG. 6 to provide the appropriate spacing to control how far below the first sheet the insert extends. The placement of the inserts in the sheet may be accomplished with a robotic arm or other computer controlled placement device, for example, the robotic arm shown and described in U.S. Pat. No. 4,904,148 may be used. The content of U.S. Pat. No. 4,904,148 is incorporated by reference herein. In FIG. 8, the sheet is aligned with the block and the bottom part 42 of the insert may extend into the manifold hole as shown in FIG. 9. The insert is then pressed into the manifold. As can be seen, the hole provides a step down diameter that limits the insertion of the insert into the manifold to a pre-determined depth. The hammer 600 presses 62 the ball 44 into the outer section of the insert, which expands the insert against the hole to seal the hole as shown in FIG. 12.

FIGS. 13-15 show alternate inserts/plugs that can be used instead of the ball type plug shown previously. It is understood that other inserts/plugs may be used as would be apparent to one of skill in the art.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of installing inserts in a block comprising:
providing a sheet having a thickness, a plurality of holes therein, and first and second surfaces facing away from each other, the plurality of holes each having an insert installed therein;
providing a block having a plurality of installation holes and a third surface;
aligning the sheet with the block such that the plurality of holes and the plurality of installation holes align and the second and third surfaces are facing each other;
installing at least one of the plurality of the inserts into at least one of the plurality of installation holes by pressing at least part of the at least one of the plurality of inserts through the corresponding one of the plurality of holes in a direction from a side of the first surface towards a side of the second surface and such that an outer surface of the at least one of the plurality of inserts is forced against a wall of corresponding to the at least one of the plurality of installation holes and such that the sheet is removable from the block when the plurality of inserts are installed in the installation holes;
wherein a plurality of inserts are held at least partially in a plurality of corresponding installation holes prior to, and during, the installation of other inserts in the block.

2. The method of claim 1 wherein said installing step further comprises expanding the at least one of the plurality of inserts against the wall.

3. The method of claim 1 wherein said installing step further comprises pressing an inner section of the corresponding insert into an outer section to expand the outer section against the wall.

4. The method of claim 3 wherein said inner section is of a ball shape.

5. The method of claim 3 wherein the pressing is accomplished with a pneumatic hammer.

6. The method of claim 1 wherein the sheet defines a bottom surface and a bottom of at least one of the plurality of inserts extends below the bottom surface such that at least part of the at least one of the plurality of inserts is within the corresponding installation hole after said aligning step.

7. The method of claim 6 wherein after the installing step a top of an outer section of the at least one of the plurality of inserts aligns at or below a face of the block such that substantially the entire outer section is contained within the installation hole.

8. The method of claim 1 wherein the block has a face and the plurality of holes are located in the face and wherein a surface of the sheet is in contact with the face after the aligning step.

9. The method of claim 1 wherein one or more of the at least one of the plurality of inserts is expanded by pulling an inner section into an outer section.

10. A method of preparing an installation sheet for installing inserts in a block, the method comprising:
providing an installation sheet with a plurality of holes therein, each one of the plurality of holes corresponding to an installation hole in the block;
providing a plurality of inserts, each insert corresponding to one of the plurality of holes;
fitting each of the plurality of inserts into the corresponding one of the plurality of holes such that when fitted into the plurality of holes, the plurality of inserts are configured to be insertable into a corresponding installation hole in the block by pressing at least part of the insert through its corresponding hole in the installation sheet and such that the sheet is removable from the block when at least one of the plurality of inserts is inserted into its corresponding one of the plurality of installation holes;
wherein a plurality of inserts are held at least partially in a plurality of corresponding installation holes prior to, and during, the insertion of other inserts in the block.

11. The method of claim 10 further comprising:
providing a second sheet having at least one void;
placing the installation sheet on top of the second sheet such that a bottom face of the installation sheet is spaced apart from a surface that the second sheet rests on;
wherein said fitting step includes fitting the inserts into the corresponding holes such that at least part of the insert extends below the bottom face of the installation sheet and into the at least one void.

12. The method of claim 10 wherein the fitting step is performed by a computer controlled fitting device.

* * * * *